United States Patent
Yamamoto

(10) Patent No.: US 7,251,431 B2
(45) Date of Patent: Jul. 31, 2007

(54) IMAGE-READING APPARATUS AND IMAGE FORMING APPARATUS

(75) Inventor: Hiroyuki Yamamoto, Kanagawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 193 days.

(21) Appl. No.: 11/181,232

(22) Filed: Jul. 14, 2005

(65) Prior Publication Data

US 2006/0233564 A1 Oct. 19, 2006

(30) Foreign Application Priority Data

Apr. 18, 2005 (JP) .............................. 2005-119608

(51) Int. Cl.
*G03G 15/00* (2006.01)

(52) U.S. Cl. ............................. 399/88; 399/90; 399/37

(58) Field of Classification Search ................... 399/37, 399/88, 90; 307/64, 66
See application file for complete search history.

(56) References Cited

U.S. PATENT DOCUMENTS 6,542,705 B2 * 4/2003 Fujita et al. .................. 399/69
7,099,605 B2 * 8/2006 Namiki ........................ 399/88

FOREIGN PATENT DOCUMENTS

JP 11-27859 A 1/1999

* cited by examiner

*Primary Examiner*—Hoang Ngo
(74) *Attorney, Agent, or Firm*—Frishauf, Holtz, Goodman & Chick, P.C.

(57) ABSTRACT

There is described an image reading apparatus, which employs the electric double layer. The image reading apparatus includes: an electric power source; an analogue image signal generating section that is coupled to the electric power source through a power line and converts an optical image to analogue image signals; an electric double layer capacitor that is coupled to the power line; a first switch that is coupled to both the electric power source and the electric double layer capacitor, in such a manner that the first switch is inserted between them; and a controlling section to control the first switch so as to make the first switch open in response to a output request signal for requesting an outputting operation of the analogue image signals.

20 Claims, 4 Drawing Sheets

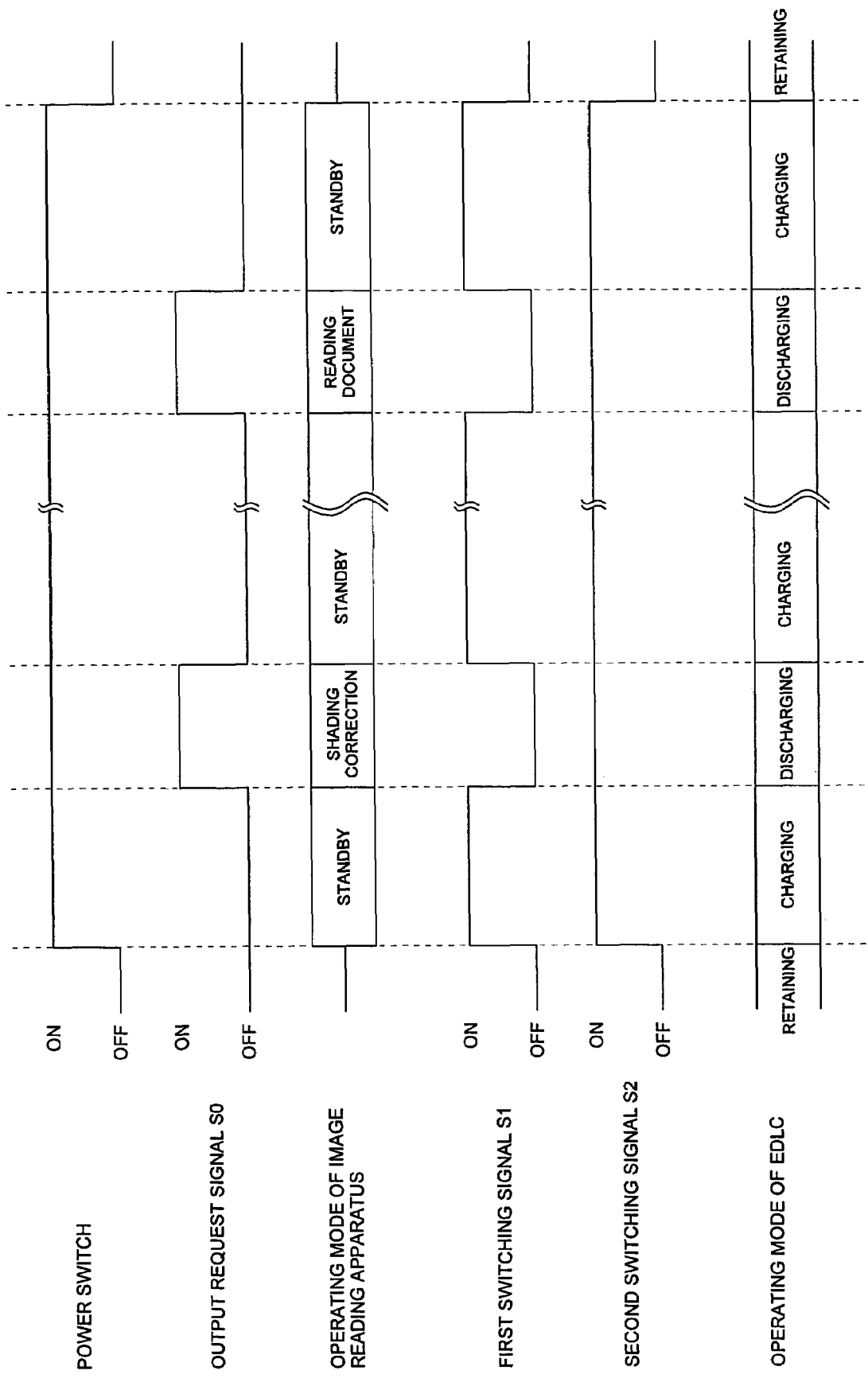

IMAGE-READING APPARATUS AND IMAGE FORMING APPARATUS

This application is based on Japanese Patent Application NO. 2005-119608 filed on Apr. 18, 2005 in Japanese Patent Office, the entire content of which is hereby incorporated by reference.

BACKGROUND OF THE INVENTION

The present invention relates to an image-recording apparatus and an image forming apparatus, each of which employs an opt-electronic converting element.

In recent years, as a result of a progressive trend of adding multi-functional features to an image forming apparatus, some image forming apparatus is provided with an image reading apparatus that converts an image, projected from a subject, such as a document, etc., by irradiating light onto it, to electronic signals, in order to acquire image data. Such the image reading apparatus employs an opt-electronic converting element, such as a CCD (Charge Coupled Device), etc., for converting an optical image to analogue image signals, and is provided with a electronic circuit that further converts the analogue image signals to digital image signals so as to acquire the image data.

Since the waveform of the analogue image signals, acquired by the opt-electronic converting element, directly represents information of the image, there has been a problem that the waveform of the analogue image signals, outputted from a circuit including the opt-electronic converting element for generating the analogue image signals, the circuit for converting the analogue image signals to the digital image signals and a circuit for driving such the circuits, is distorted by receiving influences of noises generated by an electric power source for supplying a constant voltage and other noises generated by peripheral devices.

As a countermeasure for the abovementioned problem, a primary battery that generates relatively little noise, such as an alkaline cell, a mercury cell, a lithium cell, etc., and a secondary battery that is rechargeable for repeated uses, such as a nickel hydrogen cell, a lithium polymer cell, etc., have been employed as electric power sources exclusively used for such the circuit, in order to reduce the influence of the noise introduction. Further, to reduce an amount of noises transmitting to the low-voltage driving element, a method for shortening the power supplying line by distributing layer-built polymer cells, serving as the secondary battery, in the vicinity of the circuit element has been disclosed (for instance, set forth in Patent Document 1).

[Patent Document 1]
  Tokkaihei 11-27859 (Japanese Non-Examined Patent Publication)

According to the conventional method mentioned in the above, however, when the primary battery is employed as the power source for the opt-electronic converting element, the circuit for converting the analogue image signals to the digital image signals and a circuit for driving such the circuits, it is impossible to reuse such the primary battery by resuming its original state after the primary battery is once discharged. Accordingly, it is necessary to frequently change the primary battery every time when it has discharged, resulting in increase of costs and labors for its maintenance management. In addition, when the secondary battery is employed, there has been another problem that it takes much time to charge the-secondary battery and a complicated charge-discharge controlling circuit becomes necessary, resulting in a large sized apparatus and a considerable increase of its cost. Therefore, such the conventional apparatus are not easy and friendly usable for the user.

Incidentally, as a technology developed recently, an electric double layer capacitor has become the focus of engineer's attention as a charged power source to be utilized for a starting power source of a motor, an illumination device powered by solar cells. The electric double layer capacitor has such excellent features that a huge amount of electrostatic capacity in a unit of several farads (F) can be attained, and it can be fully charged in a short time period without preparing a specific charge-discharge controlling circuit.

SUMMARY OF THE INVENTION (1) An image reading apparatus, comprising: an electric power source; an analogue image signal generating section that is coupled to the electric power source through a power line and converts an optical image to analogue image signals to output the analogue image signals; an electric double layer capacitor that is coupled to the power line; a first switch that is coupled to both the electric power source and the electric double layer capacitor, in such a manner that the first switch is inserted between the electric power source and the electric double layer capacitor; and a controlling section to control the first switch so as to make the first switch open in response to a output request signal for requesting an outputting operation of the analogue image signals.

(2) An image forming apparatus, comprising: an electric power source to supply a power source voltage through a power line; an image reading section, coupled to the power line, to read an image residing on a document so as to output image data representing the image; and an image forming section to form a reproduced image onto a recording medium, based on the image data outputted by the image reading section; wherein the image reading section includes: an analogue image signal generating section that is coupled to the electric power source through the power line and converts an optical image to analogue image signals to output the analogue image signals; an electric double layer capacitor that is coupled to the power line; a first switch that is coupled to both the electric power source and the electric double layer capacitor, in such a manner that the first switch is inserted between the electric power source and the electric double layer capacitor; and a controlling section to control the first switch so as to make the first switch open in response to a output request signal for requesting an outputting operation of the analogue image signals.

BRIEF DESCRIPTION OF THE DRAWINGS

Other objects and advantages of the present invention will become apparent upon reading the following detailed description and upon reference to the drawings in which:

FIG. 4 shows an exemplified timing chart of the present embodiment.

DETAILED DESCRIPTION OF THE PREFERRED EMBODIMENT

Figure 1:
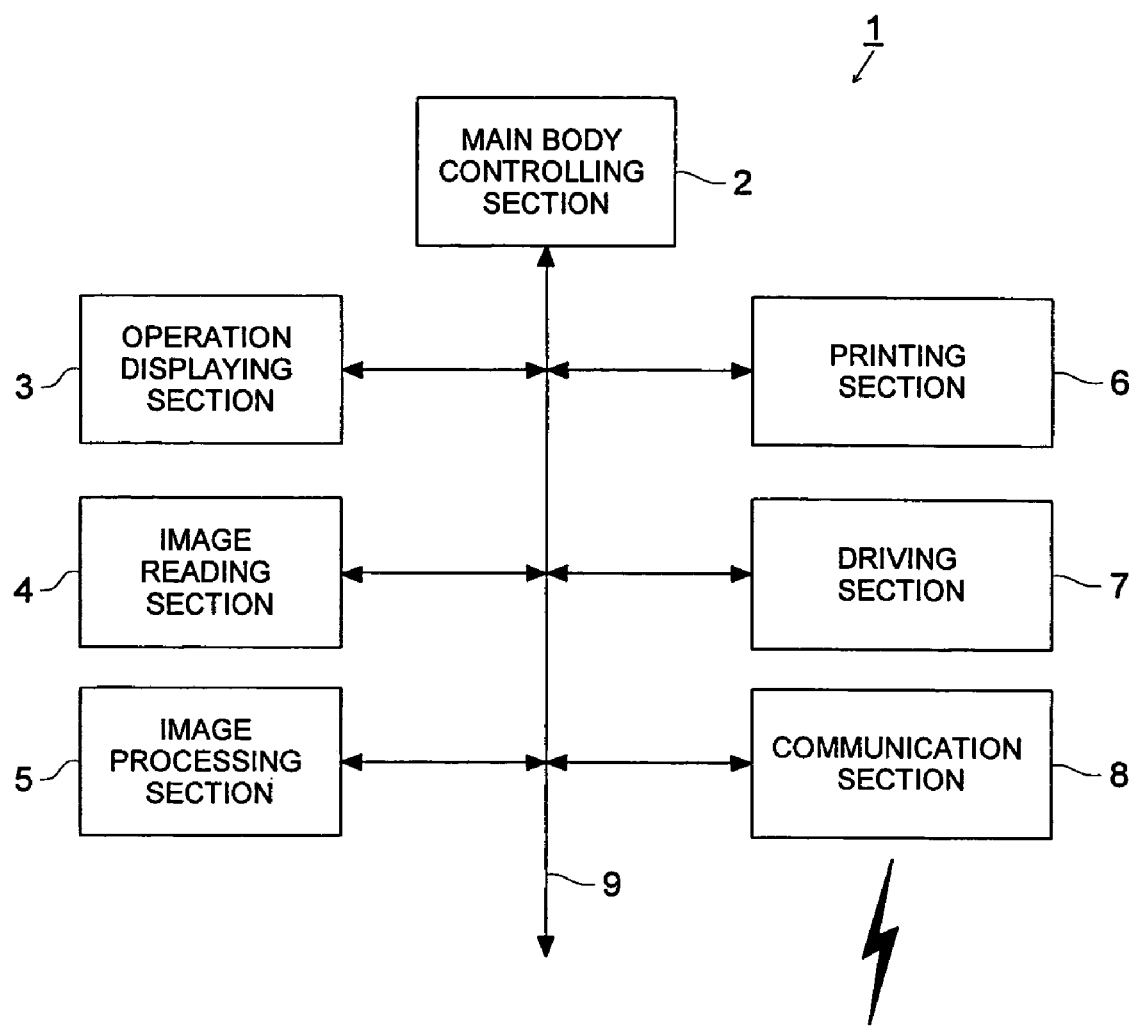
FIG. 1 shows a schematic diagram of a rough configuration of an image forming apparatus embodied in the present invention.

Referring to the drawings, an embodiment of the present invention will be detailed in the following.

At first, the configuration the embodiment will be detailed in the following._

FIG. 1 shows a schematic diagram of the rough configuration of an image forming apparatus 1 embodied in the present invention.

The image forming apparatus 1 is a digital compound apparatus that is provided with a copy function for reading an image as image data, such as text data of characters and symbols written in a document, image data of diagrams and photos, etc., and for forming a reproduced image on a recording medium, such as a paper, etc., based on the read image data, and a printer function for receiving the image data sent from a personal computer, etc., and for forming a reproduced image on a recording medium, based on the received image data. As shown in FIG. 1, the image forming apparatus 1 is constituted by a main body controlling section 2, an operation displaying section 3, an image reading section 4, an image processing section 5, an printing section 6, a driving section 7, a communication section 8, etc., and is so constituted that the abovementioned sections are coupled to each other through a signal line 9 so as to bilaterally transmit and receive various kinds between them.

The main body controlling section 2 includes a CPU (Central Processing Unit), a ROM (Read Only Memory), a RAM (Random Access Memory), a nonvolatile RAM, etc., and develops programs and data stored in the ROM and the nonvolatile RAM in a temporary storing area (not shown in the drawings) allotted in the RAM, etc. The main body controlling section 2 is also coupled to the various kinds of sections included in the whole image forming apparatus 1 so as to make it possible to bilaterally transmit and receive various kinds of information between them, based on the developed program. Accordingly, the main body controlling section 2 receives the various kinds of information from the other sections to judge the content of the each information, and outputs operating command information as a judged result to the concerned section, in order to totally control the each of the sections.

The operation displaying section 3 is provided with various kinds of operation keys, such as a copy starting key, a ten key, a power switch, etc., and outputs operation signals, inputted by such the keys, to the main body controlling section 2. Further, the operation displaying section 3 includes a LCD (Liquid Crystal Display) screen and touch panel so as to display various kinds of operation buttons, statuses of the apparatus, operating statuses of various functions, and to detect a coordinate position designated by touch actions of the operator according to the coordinate reading principle, such as an electro-magnetic induction method, a magnetic distortion method, pressure sensitive method, etc., and outputs a positional signal, representing the detected coordinate position, to the main body controlling section 2. For instance, the operation displaying section 3 outputs various kinds of controlling information designated by the key operations and the touch actions of the operator, such as a start of reading the document, a number of sheets to be transferred, a transferring density, a selection of the transferring sheet, etc., to the main body controlling section 2.

The image reading section 4 is an image reading apparatus that is constituted by a light source for irradiating the document, an optical system including a plurality of mirrors, etc., a lens for converging the light reflected from the document, a contact glass, a CCD (Charge Coupled Device) image sensor, etc. In the image reading operation of the document, the image reading section 4 conducts such operations as an ON/OFF operation of the light source, a driving operation for the optical system including the plurality of mirrors, a driving operation for the CCD image sensor, etc., in response to the command signals sent from the main body controlling section 2, so as to generate the analogue image signals from the document, and acquires the image data by converting the analogue image signals to the digital image signals, and then, outputs the image data to the image processing section 5.

In response to action commands sent from the main body controlling section 2, operation commands sent from the operation displaying section 3 and/or command data included in the data received from the communication section 8, the image processing section 5 applies various kinds of image processing operations, such as an enlarging operation, a reducing operation, a rotating operation, a position converting operation, etc., to the image data inputted from the image reading section 4 or received from the communication section 8, to output the processed image data to the printing section 6.

In response to action commands sent from the main body controlling section 2, the printing section 6 transfers and fixes a toner image onto the recording medium while conveying the recording medium, so as to achieve the image forming operation.

In response to action commands sent from the main body controlling section 2, the driving section 7 drives various kinds of sections included in the image forming apparatus 1, such as various kinds of conveyance rollers, a registration roller, a paper feeding roller, fixing rollers, etc.

The communication section 8 is constituted by a modem, a TA (Terminal Adapter), a router, etc., so as to control communicating operations with external devices coupled through a network. For instance, it is possible to receive the image data sent from an external device through the communication section 8.

Figure 2:
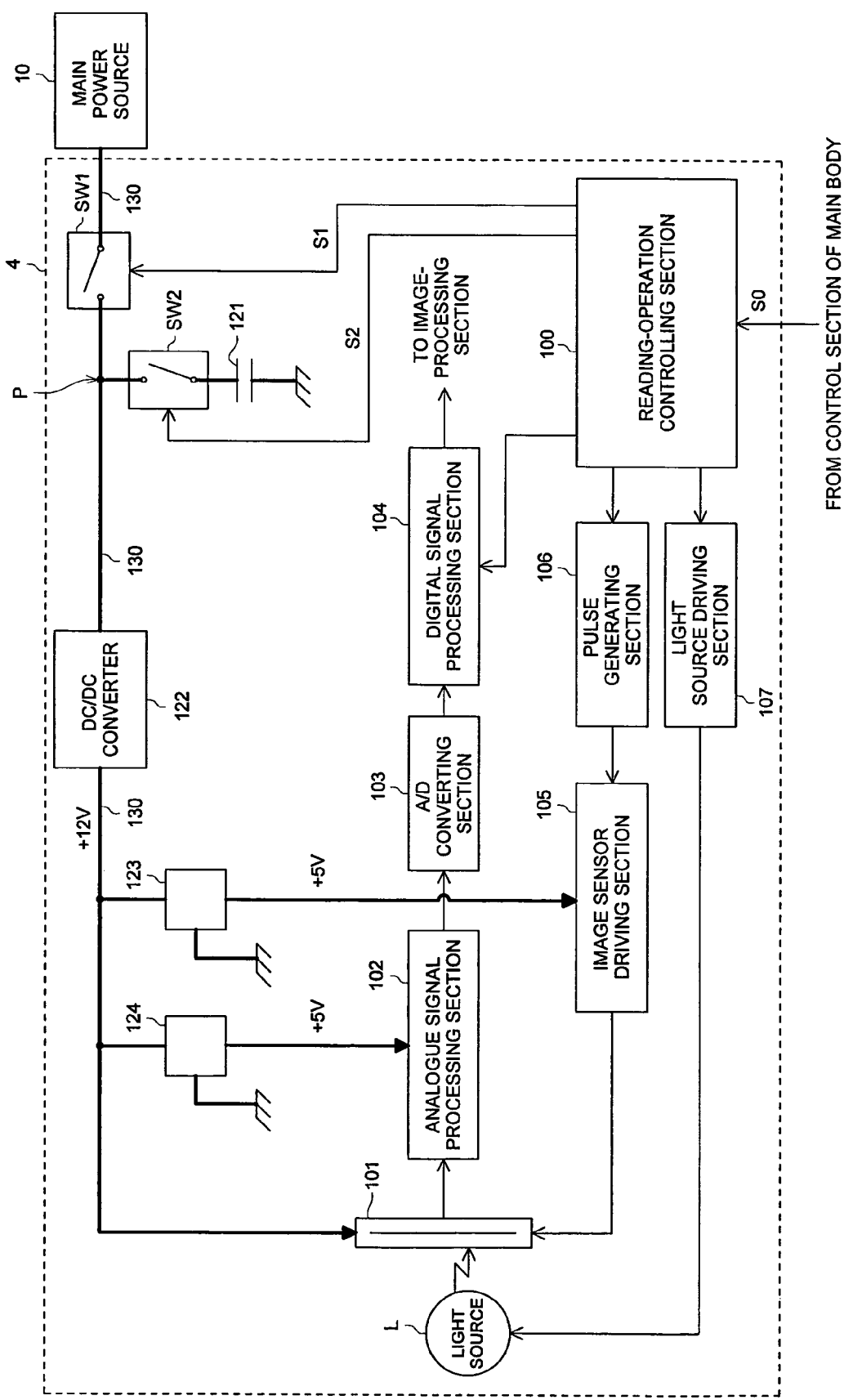
FIG. 2 shows a schematic diagram of an image reading section.

FIG. 2 shows a schematic diagram of the image reading section 4.

As shown in FIG. 2, the image reading section 4 is constituted by a light source L, a CCD image sensor 101, an analogue signal processing section 102, an A/D converting section 103, a digital signal processing section 104, an image sensor driving section 105, a pulse generating section 106, a light source driving section 107, a controlling system of a reading-operation controlling section 100, an electric double layer capacitor 121, a DC/DC converter 122, regulators 123, 124, a first switch SW1, a second switch SW2, etc.

The CCD image sensor 101 includes opt-electronic converting elements arrayed in a plurality of lines in a main-scanning direction of the document to convert an optical image to electric signals (the analogue image signals), and reads a line image for every main-scanning operation onto the document, so as to output analogue line image signals while dividing each of the analogue line image signals into an odd line image signal and an even line image signal for every one main-scanning operation. The analogue signal processing section 102, detailed later, applies image processing operations to the analogue line image signals, including both odd line image signals and even line image signals and outputted from the CCD image sensor 101, and then, the digital signal processing section 104, in the later stage, synthesizes the odd line image signals and the even line image signals with each other so as to resume the one line image signals.

Although the image reading section 4, which employs the CCD for an image sensor, will be detailed in the following as an embodiment of the present invention, it is also applicable that the image reading section 4 employs a CMOS (Complementary Metal Oxide Semiconductor), etc. for an image sensor.

The analogue signal processing section 102, serving as an analogue signal processing means, applies signal processing operations, such as a black level correction processing, etc., to the analogue image signals outputted from the CCD image sensor 101, and outputs the processed analogue image signals to the A/D converting section 103.

The A/D converting section 103 converts the processed analogue image signals, inputted from the analogue signal processing section 102, to the digital image signals, and outputs the digital image signals to digital signal processing section 104.

The digital signal processing section 104 applies various kinds of signal processing operations, such as a black level correction processing, a signal amplifying processing, a shading correction processing, etc., to the digital image signals inputted from the A/D converting section 103, and outputs the processed digital image signals to the image processing section 5.

The image sensor driving section 105, serving as an image sensor driving means, outputs timing pulses, based on driving pulses inputted from the pulse generating section 106, to the CCD image sensor 101, so as to drive and control the CCD image sensor 101.

The CCD image sensor 101, the analogue signal processing section 102 and the image sensor driving section 105 constitute an analogue image signal generating means that converts the optical image generated from the document to the analogue image signals and outputs the analogue image signals.

Based on the control signals inputted from the reading-operation controlling section 100, the pulse generating section 106 outputs the driving pulses, so as to adjust the driving timings in various kinds of sections in the image reading section 4, such as the CCD image sensor 101, the analogue signal processing section 102, the A/D converting section 103, the digital signal processing section 104, etc.

Based on the control signals inputted from the reading-operation controlling section 100, the light source driving section 107 turns ON or OFF the light emitting action of the light source L.

A main power source 10, serving as a power supplying means, is coupled to the CCD image sensor 101, the analogue signal processing section 102 and the image sensor driving section 105 through a power line 130. Incidentally, it is also applicable that the main power source 10 is also coupled to other sections of the image forming apparatus 1, so as to supply the power source voltage into the image reading section 4 and/or each section of the image forming apparatus 1. In FIG. 2, only the power line 130, which relates to the present embodiment, is shown.

The electric double layer capacitor 121 is an electric charging device utilizing the electric double layer phenomenon in which the electric charges are stored between a solid electrode (for instance, a activated charcoal) and the boundary surface of electrolytic solution. The electric double layer capacitor 121 is coupled to the power line 130 disposed between the main power source 10 and the CCD image sensor 101, the analogue signal processing section 102, the image sensor driving section 105, and is charged by the electronic power supplied from the main power source 10.

The DC/DC converter 122 is coupled to the power line 130 in such a manner that the DC/DC converter 122 is inserted into the power line 130 and disposed at a position between a coupling point of the electric double layer capacitor 121 and other coupling points of the CCD image sensor 101 for generating the analogue image signals, the analogue signal processing section 102 and the image sensor driving section 105 on the power line 130. Further, the DC/DC converter 122 serves as a circuit for converting the power source voltage, supplied from the main power source 10 or the electric double layer capacitor 121, to another voltage necessary in the image reading section 4 (for instance, +12 V).

By coupling the DC/DC converter in a manner mentioned in the above, it becomes possible to keep the power source voltage, supplied from the electric double layer capacitor, at a constant voltage value during a prescribed time period. Accordingly, it becomes possible to supply electric power having a stable power source voltage from the electric double layer capacitor to each section located downstream from the DC/DC converter, resulting in an improvement of a S/N ratio of the analogue image signals to be generated.

Each of the regulators 123, 124 serves as a circuit for converting the power source voltage, supplied from the main power source 10 or the electric double layer capacitor 121 through the DC/DC converter 122, to another voltage necessary in the analogue signal processing section 102 or the image sensor driving section 105 (for instance, +5 V).

The first switch SW1, serving as a first switching means, is coupled to the power line 130 in such a manner that the first switch SW1 is inserted into the power line 130 and disposed at a position between the main power source 10 and a coupling point of the electric double layer capacitor 121. The first switch SW1 is turned ON or OFF, based on a first switching signal S1 inputted from the reading-operation controlling section 100.

The first switch SW1 has a function for enabling or disabling the power voltage supply from the main power source 10, based on the first switching signal S1 inputted from the reading-operation controlling section 100. For instance, a mechanical relay controlled by a driving coil (an electromagnet), etc., and a solid-state relay, such as a triac, a MOSFET, etc., can be cited as the first switch SW1.

The second switch SW2, serving as a second switching means, is coupled to the power line 130 in such a manner that the second switch SW2 is inserted into the power line 130 and disposed at a position between the first switch SW1 and the electric double layer capacitor 121. The second switch SW2 is turned ON or OFF, based on a second switching signal S2 inputted from the reading-operation controlling section 100.

It is desirable that the mechanical relay controlled by the driving coil (the electromagnet), etc., is employed for the second switch SW2, so that the electric double layer capacitor 121 is securely and electrically cut off from each of sections (such as the CCD image sensor 101, the analogue signal processing section 102 and the image sensor driving section 105) located at the downstream side of the main power source 10 and the DC/DC converter 122, when the power voltage supply from the main power source 10 is stopped.

The CPU, the ROM, the RAM, etc. constitute the reading-operation controlling section 100. The CPU readouts the system program, various kinds of processing programs and data to develop them in a specific area of the RAM, so that the reading-operation controlling section 100 controls operating actions to be performed in each of the sections included in the image reading section 4, according to the programs developed by the CPU. During the image reading operation of the document, the reading-operation controlling section 100 conducts the ON/OFF controlling operation of the light source L, the movement controlling operation of the optical system including a plurality of mirrors, the drive controlling operation of the CCD image sensor 101, etc.

Based on an operating signal of the power switch of the main power source 10 and an output request signal S0 of the analogue image signal inputted from the main body controlling section 2, the reading-operation controlling section 100 serves as a controlling means for conducting the ON/OFF switching actions of the first switch SW1 and the second switch SW2.

In the embodiment of the present invention, the signal outputted from the reading-operation controlling section 100 to the first switch SW1 is defined as the first switching signal S1, while the signal outputted from the reading-operation controlling section 100 to the second switch SW2 is defined as the second switching signal S2. Further, hereinafter, an open state of the first switch SW1 or the second switch SW2 is defined as an OFF state, while a close state of the first switch SW1 or the second switch SW2 is defined as an ON state.

Based on the output request signal S0 of the analogue image signals inputted from the main body controlling section 2, the reading-operation controlling section 100 outputs the first switching signal S1 so as to open (turn OFF) the first switch SW1 during a time period of accepting the output request signal S0, and shuts out the supply of the power voltage from the main power source 10 to each of the sections (the CCD image sensor 101, the analogue signal processing section 102 and the image sensor driving section 105) located at the downstream side of the DC/DC converter 122, and controls them so that the power voltage is supplied from the electric double layer capacitor 121.

The output request signal S0 of the analogue image signals is defined as such a signal that instructs the start of reading the image residing on the document designated by the main body controlling section 2 on the basis of operating actions for the operation displaying section 3 or information inputted from the external device through the communication section 8 (namely, a reading-request signal), or a correction request signal that is designated by the external device through the main body controlling section 2 or the communication section 8, or a data acquisition request signal for correcting operations.

Incidentally, the correction request signal includes a request signal for correcting the analogue image signals and a request signal for correcting the digital image signals converted from the analogue image signals through the A/D converting process. In the following descriptions of the present embodiment, a request signal for correcting the shading in the image (namely, a shading correction request signal) will be exemplified as the correction request signal.

In the following descriptions of the present embodiment, the first switch SW1 is kept in the OFF state during a time period of accepting the output request signal S0, which is defined as a time period of requesting the output action of the analogue image signals. It is also applicable that the first switch SW1 is turned OFF in response to the input action of the output request signal S0, and the time period of requesting the output action of the analogue image signals is finalized at the time when the fact of completing the acquisition of the requested signal is detected.

Further, when a command signal for stopping the power supply from the main power source 10 is inputted into the reading-operation controlling section 100 from the main body controlling section 2 (namely, when the operating signal for turning OFF the power switch is inputted), the reading-operation controlling section 100 outputs the first switching signal S1 and the second switching signal S2 for opening (turning OFF) both the first switch SW1 and second switch SW2, so that the electric double layer capacitor 121 is electrically cut off from each of sections (such as the CCD image sensor 101, the analogue signal processing section 102 and the image sensor driving section 105) located at the downstream side of the main power source 10 and the DC/DC converter 122, when the power voltage supply from the main power source 10 is stopped.

As mentioned in the above, during a time period of accepting the output request signal S0, the electric double layer capacitor 121 supplies the power source voltage to the CCD image sensor 101, the analogue signal processing section 102 and the image sensor driving section 105, while the image sensor driving section 105 is electrically cut off from the main power source 10. Accordingly, it becomes possible for the image sensor driving section 105 to generate the driving signals without being influenced by the noises generated in the main power source 10, and to output the high-accurate driving signals, whose S/N ratio is improved, to the CCD image sensor 101. As a result, since the CCD image sensor 101 is driven by the high-accurate driving signals inputted from the image sensor driving section 105 without being influenced by the noises generated in the main power source 10 and the CCD image sensor 101 itself is electrically cut off from the main power source 10, it becomes possible to output the analogue image signals whose S/N ratio is improved more than ever. Further, since it becomes possible for the analogue signal processing section 102 to apply signal processing operations to the analogue image signals, inputted from the CCD image sensor 101 and having the improved S/N ratio, without being influenced by the noises generated in the main power source 10 and the analogue signal processing section 102 itself is electrically cut off from the main power source 10, it becomes possible to improve the S/N ratio of the processed analogue-image signals still more than ever, resulting in an improvement of a quality of the image formed in the printing section 6.

Next, the operations of the present embodiment will be detailed in the following.

Figure 3:
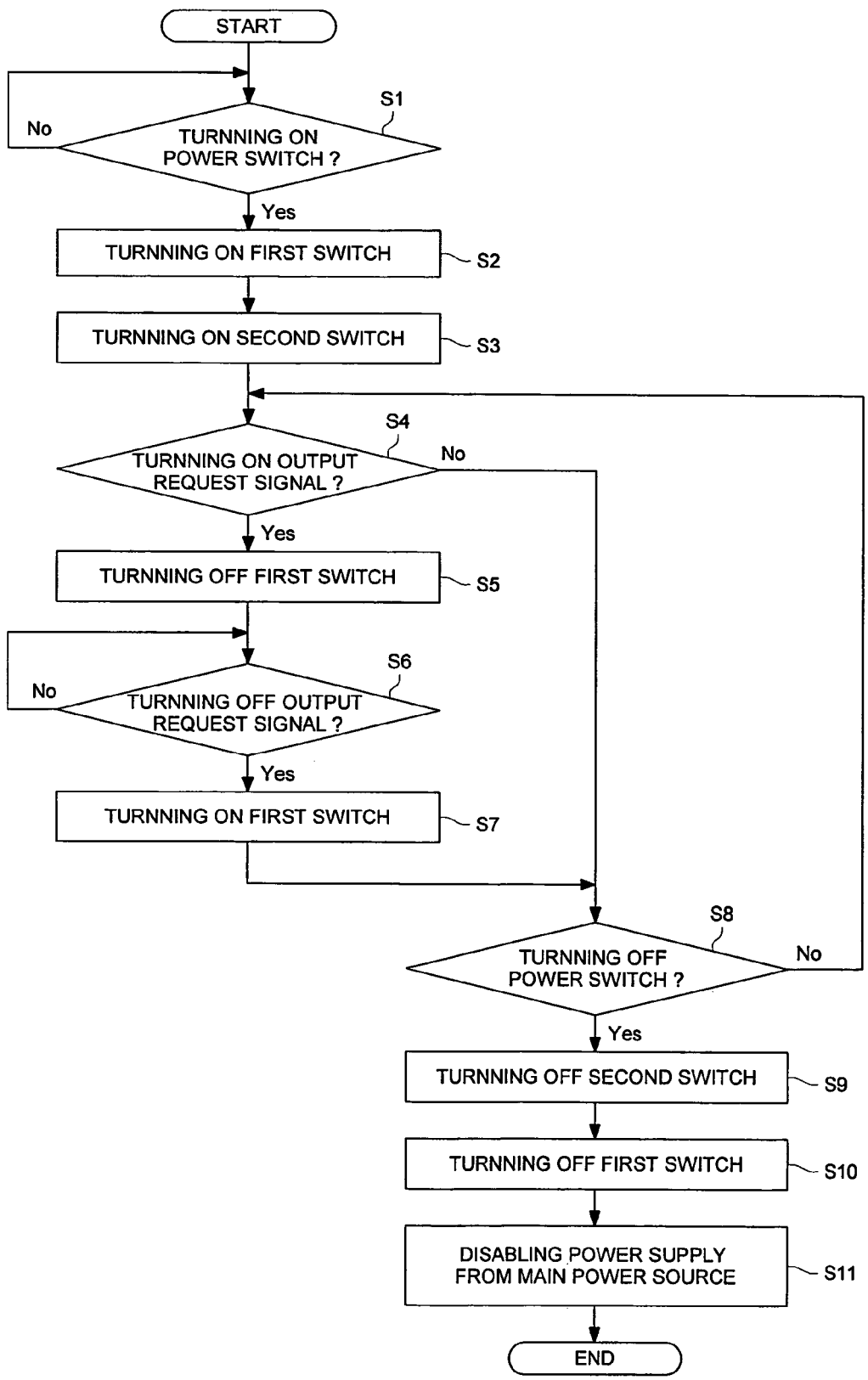
FIG. 3 shows a controlling flowchart for controlling a first switch and a second switch in the present embodiment.

FIG. 3 shows a controlling flowchart for controlling the first switch SW1 and the second switch SW2 in the present embodiment. In the following descriptions, it is assumed that the reading-operation controlling section 100 conducts the operations of the present embodiment.

The reading-operation controlling section 100 determines whether or not the operation signal for indicating the ON state of the power switch of the main power source 10 is inputted from the main body controlling section 2 (Step S1). When determining that the operation signal for indicating the ON state is inputted (Step S1; Yes), the reading-operation controlling section 100 outputs the first switching signal S1 for turning ON the first switch SW1 to the first switch SW1 (Step S2). Then, the first switch SW1 is turned ON and the main power source 10 supplies the power source voltage to the image reading section 4.

Further, after the first switching signal S1 for turning ON the first switch SW1 is outputted to the first switch SW1 (next to Step S1), the reading-operation controlling section 100 outputs the second switching signal S2 for turning ON the second switch SW2 to the second switch SW2 (Step S3). Then, the second switch SW2 is turned ON and the electric double layer capacitor 121 is charged by the power source voltage supplied from the main power source 10.

Incidentally, although the second switch SW2 is turned ON after the first switch SW1 has become the ON state in the abovementioned embodiment, it is also applicable that the first switch SW1 and the second switch SW2 are simultaneously turned ON.

When both the first switch SW1 and the second switch SW2 have become the ON state (after Step S3), the reading-operation controlling section 100 determines whether or not the output request signal S0 is inputted from the main body controlling section 2 (namely, whether or not the output request signal S0 is in the ON state) (Step S4).

When determining that the output request signal S0 is inputted from the main body controlling section 2 (Step S4; Yes), the reading-operation controlling section 100 outputs the first switching signal S1 for turning OFF the first switch SW1 to the first switch SW1 (Step S5), and determines whether or not the inputting action of the output request signal S0 from the main body controlling section 2 is disabled (namely, whether or not the output request signal S0 is in the OFF state) (Step S6).

When determining that the inputting action of the output request signal S0 from the main body controlling section 2 is not disabled (Step S6; No), the reading-operation controlling section 100 keeps waiting until the inputting action of the output request signal S0 is disabled (namely, repeat the determining action in Step S6). Concretely speaking, during the time period in which Step S6 is continuously determined as No, the power supply from the main power source 10 is shut off, and instead, the electric double layer capacitor 121 supplies the power source voltage to each of the sections located at a downstream side of the DC/DC converter 122.

When determining that the inputting action of the output request signal S0 from the main body controlling. section 2 is disabled (Step S6; Yes), the reading-operation controlling section 100 outputs the first switching signal S1 for turning ON the first switch SW1 to the first switch SW1 (Step S7).

When determining that the output request signal S0 is not inputted from the main body controlling section 2 (Step S4; No), or after Step S7, the reading-operation controlling section 100 determines whether or not the operation signal for turning OFF the power switch is inputted from the main body controlling section 2 (Step S8).

When determining that the operation signal for turning OFF the power switch is not inputted (Step S8; No), the reading-operation controlling section 100 returns to Step S4.

When determining that the operation signal for turning OFF the power switch is inputted (Step S8; Yes), the reading-operation controlling section 100 outputs the second switching signal S2 for turning ON the second switch SW2 to the second switch SW2 (Step S7). Then, the second switch SW2 is turned OFF, and the electric charge stored in the electric double layer capacitor 121 is retained, since the electric double layer capacitor 121 is electrically shut off from each of the sections located at the downstream side of the main power source 10 and the DC/DC converter 122.

After outputting the second switching signal S2 for turning OFF the second switch SW2 to the second switch SW2 (after Step S9), the reading-operation controlling section 100 outputs the first switching signal S1 for turning OFF the first switch SW1 to the first switch SW1 (Step S10).

After the first switch SW1 becomes the OFF state (after Step S10), the power supply from the main power source 10 is completely shut off (Step S11), so as to deactivate the operation of the image forming apparatus 1.

FIG. 4 shows an exemplified timing chart of the present embodiment.

The lines of the timing chart shown in FIG. 4 respectively indicate the operation signal of the power switch provided in the operation displaying section 3, the operating mode of the image reading section 4, the output request signal S0 inputted into the reading-operation controlling section 100 from the main body controlling section 2, the first switching signal S1 outputted to the first switch SW1 and second switching signal S2 outputted to the second switch SW2 by the reading-operation controlling section 100, and the EDLC operating mode of the electric double layer capacitor 121.

Initially, at time t1, since the operation signal of the power switch is turned into the ON state from the OFF state and the output request signal S0 is in the OFF state, the operating mode of the image reading section 4 is turned to a standby state. Accordingly, both the first switching signal S1 and the second switching signal S2 are switched into the ON state from the OFF state, and the electric double layer capacitor 121 is switched into the charging state, in which the power source voltage for the charging operation is supplied from the main power source 10, from the charge retaining state.

At time t2, the operation signal of the power switch is in the ON state, and the shading correction request signal is inputted from the main body controlling section 2, and then, the output request signal S0 is switched into the ON state from the OFF state. Accordingly, since the first switching signal S1 is switched into the OFF state from the ON state and the power supply from the main power source 10 is disabled, the electric double layer capacitor 121 is switched into the discharging state from the charging state.

At time t3, since the operation signal of the power switch is in the ON state and the inputting operation of the shading correction request signal from the main body controlling section 2 is disabled, the output request signal S0 is switched into the OFF state from the ON state. Accordingly, since the first switching signal S1 is switched into the ON state from the OFF state, the electric double layer capacitor 121 is switched into the charging state, in which the power source voltage for the charging operation is supplied from the main power source 10, from the discharging state.

As mentioned in the above, during the time period from time t2 to time t3, namely, the time period in which the shading correction request signal is inputted, since the electric double layer capacitor 121 supplies the power source voltage to the sections located at the downstream side of the DC/DC converter 122, an amount of the noises, originally generated in the main power source 10 and mixed into the outputted analogue image signals, can be reduced, and therefore, it is possible to improve the shading correction efficiency, namely, correcting operations of unevenness of the sensitivity for every opt-electronic converting element and/or unevenness of the luminance of the light source, and the accuracy of variance correction caused by the luminance reduction occurring at peripheral area, etc. Accordingly, it becomes possible to improve the quality of the image formed by the printing section 6.

At time t4, the operation signal of the power switch is in the ON state, and the reading request signal is inputted from the main body controlling section 2, and then, the output request signal S0 is switched into the ON state from the OFF state. Accordingly, since the first switching signal S1 is switched into the OFF state from the ON state and the power supply from the main power source 10 is disabled, the electric double layer capacitor 121 is switched into the discharging state from the charging state.

At time t5, since the operation signal of the power switch is in the ON state and the inputting operation of the reading request signal from the main body controlling section 2 is disabled, the output request signal S0 is switched into the OFF state from the ON state. Accordingly, since the first switching signal S1 is switched into the ON state from the OFF state, the electric double layer capacitor 121 is switched into the charging state, in which the power source voltage for the charging operation is supplied from the main power source 10, from the discharging state.

As mentioned in the above, during the time period from time t4 to time t5, namely, the time period in which the image data are read from the document, since the electric double layer capacitor 121 supplies the power source voltage to the sections located at the downstream side of the DC/DC converter 122, an amount of the noises, originally generated in the main power source 10 and mixed into the outputted analogue image signals, can be reduced, and therefore, it is possible to improve the S/N ratio of the analogue image signals. Accordingly, it becomes possible to improve the quality of the image formed by the printing section 6.

At time t6, since the operation signal of the power switch is turned into the OFF state from the ON state and the output request signal S0 is in the OFF state, the operating mode of the image reading section 4 is turned to a disable state. Further, since the operation signal of the power switch is turned into the OFF state, the first switching signal S1 is switched into the OFF state from the ON state after the second switching signal S2 is switched into the OFF state from the ON state.

Since the first switching signal S1 is switched into the OFF state after the second switching signal S2 is switched into the OFF state, it is possible to disable the power supply from the main power source 10 after electrically cutting off the electric double layer capacitor 121 from the sections located at the downstream side of the main power source 10 and the DC/DC converter 122. Accordingly, since the electric charge stored in the electric double layer capacitor 121 is retained still after the image forming apparatus 1 is disabled, it becomes possible to shorten the time interval for charging the electric double layer capacitor 121 when the power supply from the main power source 10 is resumed, resulting in realization of an efficient energy management.

Incidentally, in the present embodiment, after the second switch SW2 is turned OFF and further the first switch SW1 is turned OFF, the power supply from the main power source 10 is made to be disabled. It is also possible however, to acquire the same effect as the above when employing the configuration in which the power supply from the main power source 10 is made to be disabled and the second switch SW2 is simultaneously turned OFF, after the first switch SW1 is turned OFF.

Although the digital compound apparatus has been exemplified as an applicable example of the image reading apparatus embodied in the present invention described in the foregoing, it is needless to say that the present invention is also applicable for a scanner or a facsimile apparatus.

As detailed in the foregoing, during the time period in which the output request signal S0 is still accepted, the power supply, to be supplied the CCD image sensor 101, the analogue signal processing section 102, the image sensor driving section 105, is cut off from the main power source 10, and the power source voltage is supplied to them only from the electric double layer capacitor 121 to activate them. Accordingly, an amount of the noises, originally generated in the main power source 10 and mixed into the outputted analogue image signals, can be reduced, and therefore, it is possible to improve the S/N ratio of the analogue image signals. Accordingly, it becomes possible to improve the quality of the image formed by the printing section 6.

According to the present embodiment, the following effects can be attained.

(1) Since, in response to the output request signal of the analogue image signals, the power source voltage to be supplied to the analogue image signals generating section is cut off from the main power source, an amount of the noises, originally generated in the main power source and mixed into the outputted analogue image signals, can be reduced, and therefore, it is possible to improve the S/N ratio of the analogue image signals, resulting in an improvement of the image quality.

(2) Since the power source voltage to be supplied to the analogue image signals generating section is cut off from the main power source while the output operation of the analogue image signals is requested, it becomes possible to reduce the amount of the noises to be mixed into the requested signals, resulting in an improvement of the image quality.

(3) Since, at least during a time period in which the analogue image signals generating section converts the optical image to the analogue image signals and outputs them, the power source voltage is supplied from the electric double layer capacitor and the power source voltage to be supplied to the analogue image signals generating section is cut off from the main power source, it becomes possible to improve the S/N ratio of the analogue image signals, resulting in an improvement of the image quality.

(4) When the power source voltage from the power source is disabled, the electric double layer capacitor is electrically shut off from the analogue image signal generating section and the power source, it is possible to retain the electric charge stored in the electric double layer capacitor. Accordingly, since the charging time can be shortened when the power supply form the power source is resumed, it becomes possible to shorten the waiting time for the image reading operation and to conduct an efficient energy management.

(5) Since the power source voltage to be supplied from the electric double layer capacitor to the analogue image signal generating section can be kept at a constant voltage value, it becomes possible to supply a stabilized power source voltage. Accordingly, it becomes possible to improve the S/N ratio of the analogue image signals, and to acquire a stabilized and high-quality image.

(6) Since the first switch-is made to be open in response to the reading request signal, an amount of the noises, originally generated in the power source and mixed into the analogue image signals outputted from the analogue image signal generating section, can be reduced, and therefore, it is possible to improve the S/N ratio of the image signals read from the document, resulting in an improvement of the image quality.

(7) Since the correcting operation can be performed, based on the high accurate data, it becomes possible to acquire image data having a good image quality.

(8) It becomes possible to improve the shading correction efficiency, for instance, correcting operations of unevenness of the sensitivity for every opt-electronic converting element and/or unevenness of the luminance of the light source, and the accuracy of variance correction caused by the luminance reduction occurring at peripheral area, etc. Accordingly, it becomes possible to improve the quality of the image.

(9) Since the electric double layer capacitor supplies the power source voltage to the image sensor so as to reduce an amount of the noises, originally generated in the power source and mixed into the analogue image signals outputted from the image sensor, it becomes possible to improve the S/N ratio of the analogue image signals outputted from the image sensor.

(10) Since the electric double layer capacitor supplies the power source voltage to the analogue signal processing section and it is possible for the analogue signal processing section to apply the signal processing to the analogue image signals without being influenced by the mixture of the noises generated by the power source, it becomes possible to further improve the S/N ratio of the analogue image signals outputted from the analogue signal processing section.

(11) Since the electric double layer capacitor supplies the power source voltage to the image-sensor driving section and it is possible for the image-sensor driving section to generate the driving signals without being influenced by the mixture of the noises generated by the power source, it becomes possible to improve the S/N ratio of the driving signals generated in the image-sensor driving section, and accordingly, it becomes possible to acquire still high-accurate analogue image signals.

(11) By employing the image reading apparatus, embodied in the present embodiment, in an image forming apparatus, it becomes possible to provide the image forming apparatus, which makes it possible to form the high quality image.

Disclosed embodiment can be varied by a skilled person without departing from the spirit and scope of the invention.

What is claimed is:

1. An image reading apparatus, comprising:
an electric power source;
an analogue image signal generating section that is coupled to said electric power source through a power line and converts an optical image to analogue image signals to output said analogue image signals;
an electric double layer capacitor that is coupled to said power line;
a first switch that is coupled to both said electric power source and said electric double layer capacitor, in such a manner that said first switch is inserted between said electric power source and said electric double layer capacitor; and
a controlling section to control said first switch so as to make said first switch open in response to an output request signal for requesting an outputting operation of said analogue image signals.

2. The image reading apparatus of claim 1,
wherein said controlling section controls said first switch so as to keep said first switch open while said outputting operation of said analogue image signals is requested.

3. The image reading apparatus of claim 1,
wherein said electric double layer capacitor supplies an electric voltage to said analogue image signal generating section in response to said output request signal.

4. The image reading apparatus of claim 1, further comprising:
a second switch that is coupled to both a connecting point on said power line, to be connected to said electric double layer capacitor, and said electric double layer capacitor, in such a manner that said second switch is inserted between said connecting point and said electric double layer capacitor;
wherein said controlling section controls said second switch so as to make said first switch open when a power supply from said electric power source is deactivated.

5. The image reading apparatus of claim 1, further comprising:
a DC/DC converter that is coupled to both a connecting point on said power line, to be connected to said electric double layer capacitor, and said analogue image signal generating section, in such a manner that said DC/DC converter is inserted between said connecting point and said analogue image signal generating section.

6. The image reading apparatus of claim 1,
wherein said output request signal for requesting said outputting operation of said analogue image signals is a reading request signal for instructing said analogue image signal generating section to read an image residing on a document.

7. The image reading apparatus of claim 1,
wherein said output request signal for requesting said outputting operation of said analogue image signals is at least one of a correction request signal for correcting said analogue image signals or image data based on said analogue image signals, and a data acquisition request signal for acquiring data necessary for correcting said analogue image signals or image data based on said analogue image signals.

8. The image reading apparatus of claim 7,
wherein said output request signal for requesting said outputting operation of said analogue image signals is a shading correction request signal.

9. The image reading apparatus of claim 1,
wherein said analogue image signal generating section includes an image sensor having a function of converting said optical image to said analogue image signals.

10. The image reading apparatus of claim 9,
wherein said analogue image signal generating section further includes an analogue image signal processor for applying signal processing to analogue image signals outputted by said image sensor.

11. The image reading apparatus of claim 9,
wherein said analogue image signal generating section further includes an image sensor driver for driving said image sensor.

12. An image forming apparatus, comprising:
an electric power source to supply a power source voltage through a power line;
an image reading section, coupled to said power line, to read an image residing on a document so as to output image data representing said image; and
an image forming section to form a reproduced image onto a recording medium, based on said image data outputted by said image reading section;
wherein said image reading section includes:
an analogue image signal generating section that is coupled to said electric power source through said power line and converts an optical image to analogue image signals to output said analogue image signals;
an electric double layer capacitor that is coupled to said power line;
a first switch that is coupled to both said electric power source and said electric double layer capacitor, in such a manner that said first switch is inserted between said electric power source and said electric double layer capacitor; and
a controlling section to control said first switch so as to make said first switch open in response to an output request signal for requesting an outputting operation of said analogue image signals.

13. The image forming apparatus of claim 12,
wherein said controlling section controls said first switch so as to keep said first switch open while said outputting operation of said analogue image signals is requested.

14. The image forming apparatus of claim 12,
wherein said electric double layer capacitor supplies an electric voltage to said analogue image signal generating section in response to said output request signal.

15. The image forming apparatus of claim 12,
wherein said image reading section further includes:
- a second switch that is coupled to both a connecting point on said power line, to be connected to said electric double layer capacitor, and said electric double layer capacitor, in such a manner that said second switch is inserted between said connecting point and said electric double layer capacitor;

wherein said controlling section controls said second switch so as to make said first switch open when a power supply from said electric power source is deactivated.

16. The image forming apparatus of claim 12,
wherein said image reading section further includes:
- a DC/DC converter that is coupled to both a connecting point on said power line, to be connected to said electric double layer capacitor, and said analogue image signal generating section, in such a manner that said DC/DC converter is inserted between said connecting point and said analogue image signal generating section.

17. The image forming apparatus of claim 12,
wherein said output request signal for requesting said outputting operation of said analogue image signals is a reading request signal for instructing said analogue image signal generating section to read said image residing on said document.

18. The image forming apparatus of claim 12,
wherein said output request signal for requesting said outputting operation of said analogue image signals is at least one of a correction request signal for correcting said analogue image signals or image data based on said analogue image signals, and a data acquisition request signal for acquiring data necessary for correcting said analogue image signals or image data based on said analogue image signals.

19. The image forming apparatus of claim 18,
wherein said output request signal for requesting said outputting operation of said analogue image signals is a shading correction request signal.

20. The image forming apparatus of claim 12,
wherein said analogue image signal generating section includes an image sensor having a function of converting said optical image to said analogue image signals.

* * * * *